United States Patent
Hiss et al.

(10) Patent No.: US 8,511,640 B2
(45) Date of Patent: Aug. 20, 2013

(54) BALL VALVE WITH DETACHABLE SLIDE BEARING BUSHES

(75) Inventors: Helmut Hiss, Ispringen (DE); Markus Strupp, Rappweiler-Zwalbach (DE)

(73) Assignee: Hydac Accessories GmbH, Sulzbach/Saar (DE)

( * ) Notice: Subject to any disclaimer, the term of this patent is extended or adjusted under 35 U.S.C. 154(b) by 355 days.

(21) Appl. No.: 12/654,516

(22) Filed: Dec. 22, 2009

(65) Prior Publication Data
US 2011/0147634 A1    Jun. 23, 2011

(51) Int. Cl.
*F16K 5/06* (2006.01)

(52) U.S. Cl.
USPC ............... 251/214; 251/315.09; 251/367

(58) Field of Classification Search
USPC ............... 251/214, 315.01–315.16, 367
See application file for complete search history.

(56) References Cited

U.S. PATENT DOCUMENTS

| | | | | |
|---|---|---|---|---|
| 2,208,394 A * | 7/1940 | Scherer | | 251/312 |
| 2,963,260 A * | 12/1960 | Siravo | | 251/54 |
| 3,155,368 A * | 11/1964 | Shafer | | 251/315.09 |
| 3,266,769 A * | 8/1966 | Shand | | 251/172 |
| 3,348,804 A * | 10/1967 | Piccardo | | 251/214 |
| 3,384,337 A * | 5/1968 | Brown | | 251/172 |
| 3,584,641 A * | 6/1971 | Milleville et al. | | 251/315.08 |
| 3,737,145 A * | 6/1973 | Heller et al. | | 251/309 |
| 4,262,688 A * | 4/1981 | Bialkowski | | 137/242 |
| 4,326,697 A * | 4/1982 | Autage et al. | | 251/124 |
| 4,337,919 A * | 7/1982 | Ripert | | 251/304 |
| 4,339,112 A * | 7/1982 | Connolly et al. | | 251/367 |
| 4,505,294 A * | 3/1985 | Walter | | 137/241 |
| 5,251,663 A * | 10/1993 | Christianson et al. | | 137/876 |
| 5,333,955 A * | 8/1994 | Papa | | 384/291 |
| 5,692,726 A * | 12/1997 | Adachi et al. | | 251/368 |
| 6,874,757 B2 * | 4/2005 | Hallett | | 251/315.08 |

FOREIGN PATENT DOCUMENTS

| | | |
|---|---|---|
| DE | 1 042 322 | 10/1958 |
| DE | 203 06 420 | 10/2004 |

OTHER PUBLICATIONS

Hydac International Kugelhähne, pp. 1-8, Hydac Accessories GmbH.

* cited by examiner

*Primary Examiner* — John Bastianelli
(74) *Attorney, Agent, or Firm* — Roylance, Abrams, Berdo & Goodman, LLP

(57) ABSTRACT

A ball valve has a valve housing (2) receiving ball spindle (6) pivoted around an axis in the housing (2). A ball body (12) as a blocking element is between the input part and the output part of a media passage (4) of the housing. The flow opening (14) located in the ball body (12) is alignable with the passage (4) for unblocking the ball valve by turning the ball spindle (12). The ball body (12) is supported on two identical end sections (8, 10) connected to and axially spaced from the ball body (12). The support on at least one end section (8, 10) is a support cover (26) having integrated slide bearing elements (34, 36) detachably mounted on the housing (2).

8 Claims, 2 Drawing Sheets

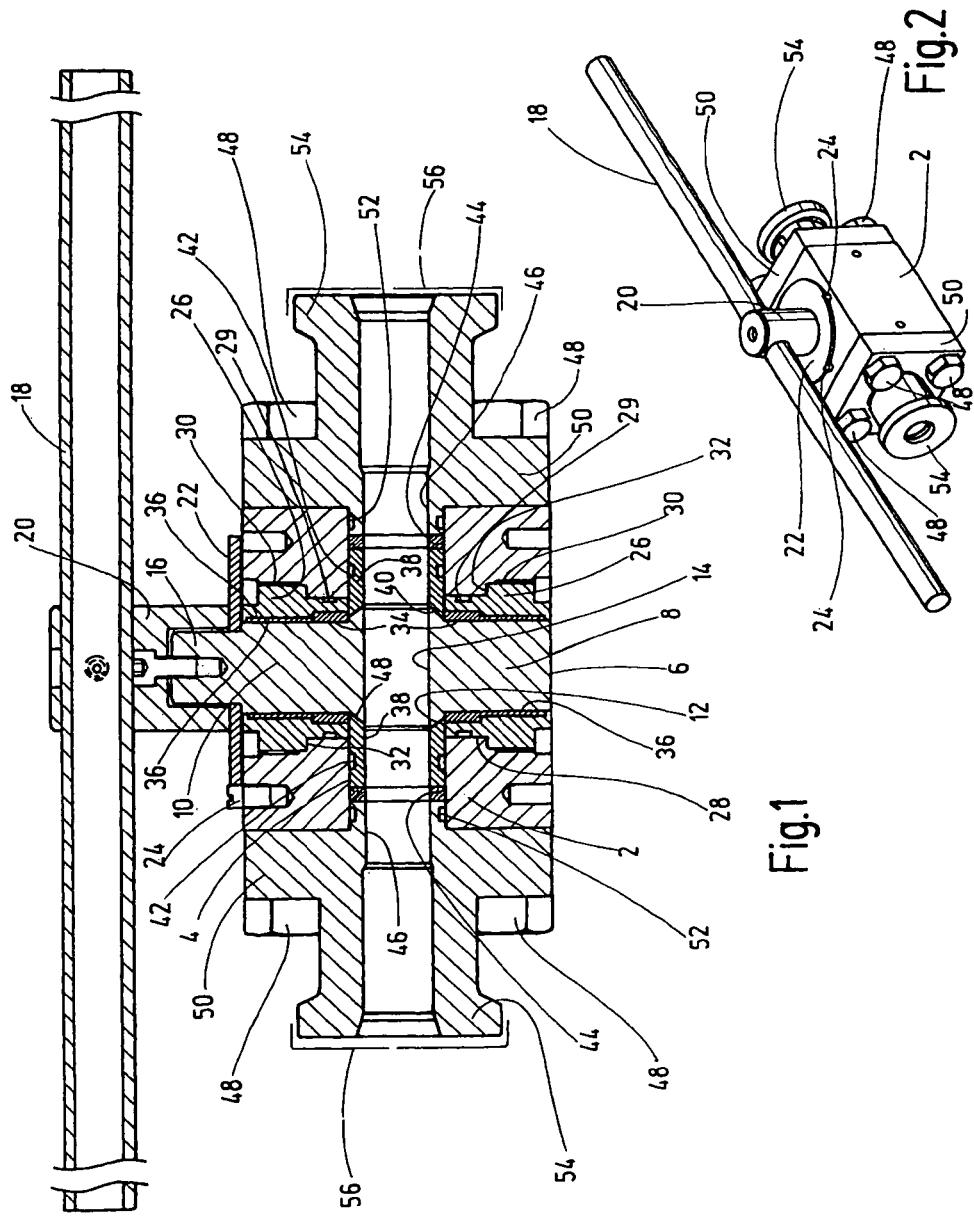

BALL VALVE WITH DETACHABLE SLIDE BEARING BUSHES

FIELD OF THE INVENTION

The invention relates to a ball valve, in particular for highly pressurized media, with a valve housing in which a ball spindle is pivoted around an axis in the housing at an axial distance from the pivot support. The ball valve has a ball body as a blocking element between the input part and the output part of a passage of the housing for media. The flow opening located in the ball body can be oriented to the passage for media for unblocking the ball valve by turning the ball spindle.

BACKGROUND OF THE INVENTION

Ball valves of this type are known and are readily available in commerce, see for example the Hydac brochure D 5.501.19/06.03. These ball valves are used for blocking of volumetric flows preferably in hydraulic circuits, and for gaseous and/or aggressive media. These valves are not used as throttle valves, but as controllable blocking elements which in the opened state form a full flow passage for unobstructed flow of a medium.

In the common use of these valves in systems with high system pressures, the supply connections between the valve housing and pipeline system must be made especially reliable and secure. At high pressure stages, for example in the range of 500 bar, supply connections by welding or positive clamping are conventional. Those connections yield high operating reliability. However, problems arise when replacement of the ball valve is necessary, for example, at the end of the service life of wearing parts such as the ball spindle. For supply connections that cannot be easily disconnected, nondestructive dismounting is not possible.

SUMMARY OF THE INVENTION

An object of the invention is to provide a ball valve which, if necessary, enables dismounting of the wearing parts from the valve housing without disconnecting the supply connections on the valve housing.

According to the invention this object is basically achieved by a ball valve having a ball spindle supported on two end sections made identically and connected to the ball body on both sides. The support on at least one end section is formed by a support cover having integrated slide bearing elements and detachably mounted on the housing. Nondestructive dismounting of the ball spindle and the pertinent wearing parts is possible such that at least one support cover on the end section of the ball spindle is removed and the flanges are detached. In this way, with motion axial with respect to the spindle axis, the ball spindle can be drawn out of the housing, and the second end section is withdrawn from its slide support. The ball spindle cannot be removed without the flanges being detached or removed.

In an especially advantageous manner, the support on the two end sections is formed by support covers detachably mounted on the housing. Each support cover is made in the form of a bearing sleeve, is made identical and can be installed from the exterior of the housing in the spindle passage of the housing. Preferably, each support cover can be screwed in. By dismounting the two support covers and the flanges, both the slide bearing elements of the two support covers as wearing parts can be replaced. Also, the passage for media in the housing is comfortably accessible from the spindle passage so that here wearing parts potentially located in the passage for media can also comfortably be replaced, if necessary.

For especially advantageous embodiments, the spindle passage of the housing is stepped such that its diameter in the region bordering the ball body of the ball spindle located in the housing is slightly larger than the outside diameter of the ball body and in the region nearer the exterior of the housing is larger in comparison. In this configuration of the spindle passage, the installation of bearing sleeves which can be screwed in is made especially simple and reliable because the bearing sleeves matched to the spindle passage and likewise stepped on the exterior can be screwed in as far as contact with the steps. The steps affect exact axial positioning of the bearing sleeves.

In an especially advantageous manner, the bearing seats stepped on the inside of the bearing sleeves for slide bearing bushes are formed and are located axially at a distance from one another. Between the bearing seats an O-ring is provided. In an optionally required replacement of wearing parts, the slide bearing elements can be replaced separately, while the bearing sleeves themselves can be further re-used.

In an especially advantageous manner, in the passage of the housing for the media in each section adjoining the ball body a sleeve body can form a sealing shell in interaction with the ball body. In passage through a spring arrangement, the sleeve body is pretensioned against the ball body. This construction ensures not only perfect sealing due to the resilient contact of the sleeve body with the ball body of the ball spindle, but the sleeve bodies can also be replaced separately as wearing parts from the spindle passage when the spindle body is dismounted from the spindle passage after removal of the support cover.

For optimum operating behavior, for ball spindles and sealing shells, there can be a pairing of material of an alloy based on cobalt or an aluminum-copper alloy and the slide bearing bushes can be formed from a copper-aluminum alloy.

In especially advantageous embodiments, on both ends of the passage for the media on the respective exterior of the housing, a flange can be attached by screws with an integrated connection piece for forming the connections to the fluid system.

Especially advantageously, the identically made flanges have a pipe socket projecting into the passage for the media. The pipe socket end forms a support for a corrugated spring washer pretensioning the respective sleeve body for sealing against the ball body of the ball spindle.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a side elevational view in section of a ball valve according to a first exemplary embodiment of the invention, drawn approximately at half full size;

FIG. 2 is a perspective oblique view of the ball valve of FIG. 1 shown reduced even further.

DETAILED DESCRIPTION OF THE INVENTION

Figure 3:
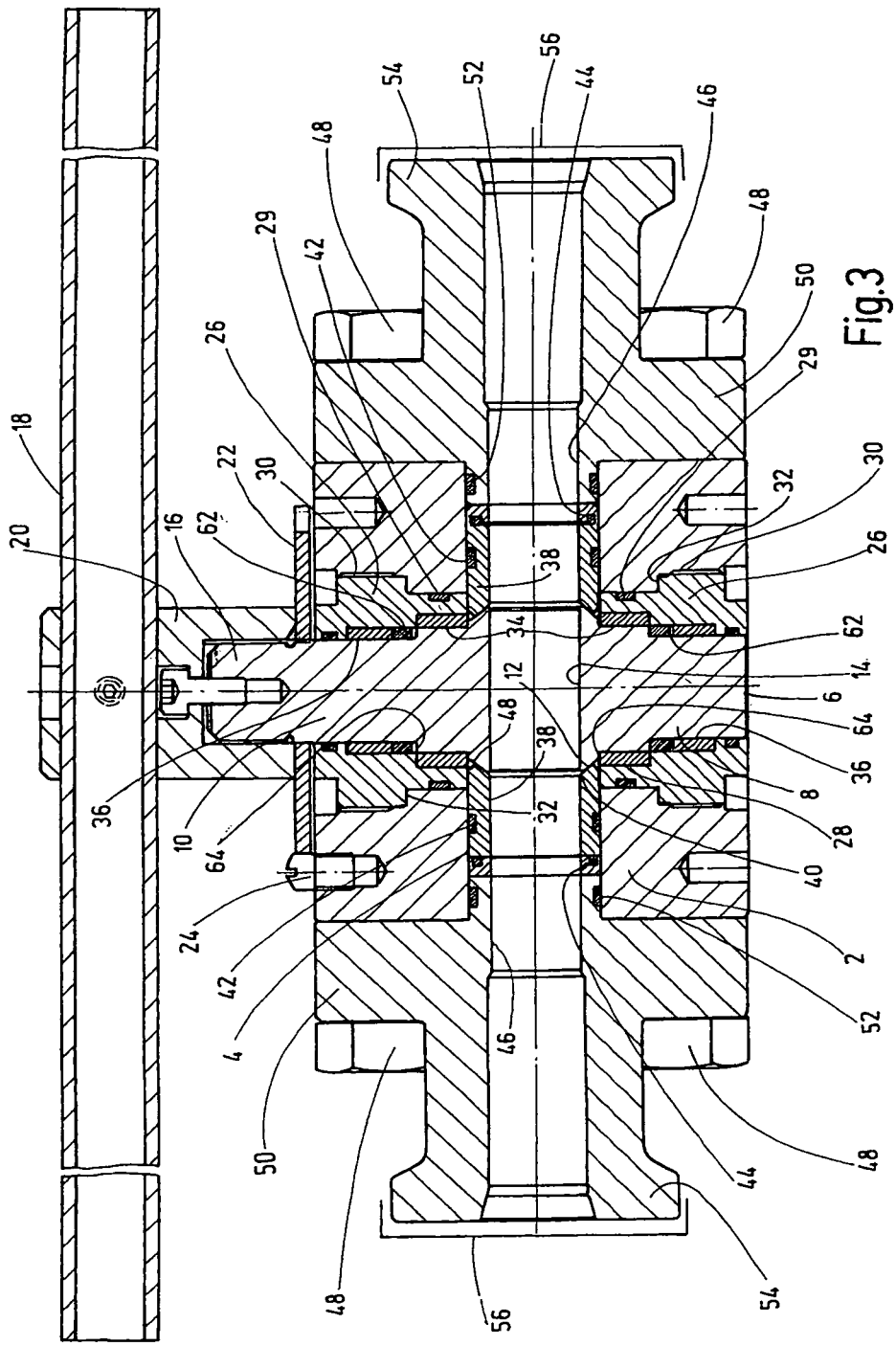
FIG. 3 is a side elevational view in section of a ball valve according to a second exemplary embodiment of the invention, enlarged compared to FIG. 1.

The embodiments of the ball valve shown in the drawings have a one-piece valve housing 2 in the form of a rectangular cuboid. The flow path for the pertinent medium to be controlled is a passage centrally located in the housing 2 in the form of an opening 4. As the controllable blocking element for blocking and clearing the flow path, in the housing 2 with an axis perpendicular to the opening 4, a ball spindle 6 is pivoted. The ball spindle 6 forms between two end sections 8 and 10 a ball body 12, as is conventional in ball valves. Ball body 12 forms the actual blocking body of the ball spindle 6. For this purpose, the ball body 12 has a flow opening 14 adjustable by turning the ball spindle 6 relative to the opening 4 of the housing 2 forming the passage for the media. To switch the ball valve by turning the ball spindle 6, on a shoulder 16 of the end section 10 of the ball spindle 6 at the top in FIG. 1, a two-arm trip lever 18 is connected to the extension 16 via a coupling piece 20. A limiting washer 22 is connected to the coupling piece 20 and on its periphery interacts with stop pins 24 to limit the rotational mobility of the ball spindle 6 to a rotation of 90° degrees to turn the ball spindle out of the open position of the ball valve shown in FIGS. 1 and 3 and into the blocking position turned 90° thereto.

The ball spindle 6 is pivoted on its two identically made end sections 8 and 10. The support is formed on the two end sections 8, 10 by respective support covers made in the form of support sleeves 26. They are made the same as identical parts and are installed in spindle passage from opposite sides of the housing 2. Spindle passage 28 is stepped having its diameter in the inner end section adjacent to the ball body 12 of the ball spindle 6 slightly larger than the outside diameter of the ball body 12 and in the region nearer the exterior of the housing 2 larger in comparison. In the illustrated examples in which the support sleeves 26 are installed in the housing 2 by screwing down or are threadedly engaged with the valve housing 2, the spindle passage 28 in the widened outer region has an inside thread 30 into which the pertinent bearing sleeve 26 with an outside thread can be screwed. Due to the stepped shape of the spindle passage 28, the support sleeve 26 stepped in a suitable manner. When the support sleeve 26 is screwed into the spindle passage 28, the support sleeve 26 is in contact with the step 32 located in the passage and thus is axially positioned in the screwed-in state. The inside of the bearing sleeves 26 is likewise stepped to form bearing seats for the inner slide bearing bushes 34 and outer slide bearing bushes 36. Between the bushes 34, 36 a small intermediate space is provided to receive an O-ring 62 (in FIG. 3) for sealing relative to the ball spindle 6. The slide bearing bushes 34 and 36 are made of a copper-aluminum alloy. For a ball spindle 6 of a cobalt-based alloy, for example Stellite®6, this selection constitutes a favorable pairing of materials.

In the opening 4 forming the passage for the media, on each section bordering the ball body 12, a sleeve-like sealing shell in the form of a sleeve body 38 with a sealing edge 40 is matched to the outside arch of the ball body 12. An O-ring 42 is located at half the sleeve length for sealing against the housing opening 4. The sleeve bodies 38 are each elastically pretensioned against the ball body 12. A spring element is designed for this purpose, in particular a corrugated spring washer 44 or a plate stack, is supported on a pipe socket 46 extending from a flange 50 attached by screws 48 to the housing 2. Pipe socket 46 extends into the housing opening 4 and is sealed to housing 2 with an O-ring 52. The identically made flanges 50 each have a connecting piece 54 for forming the connection to a fluid system (not shown). The connecting pieces 54 can be covered by a protective hood 56 clipped on for purposes of storage and shipping.

When the support sleeves 26 are dismounted on both support end sections 8 and 10, all bearing bushes 34 and 36 can be replaced as wearing parts. Upon bearing sleeves 26 being removed on both sides, within the spindle passage 28 enough free space is available to replace the sleeve bodies 38 as wearing parts from the inside of the spindle passage 28. These advantages include the advantage that the ball valve can be efficiently and economically produced because it is assembled from identical parts. Specifically, two identical flanges 50, identical support covers in the form of support sleeves 26, identical bearing bushes 34 and 36 and identical sleeve bodies 38 pretensioned with an identically made spring arrangement each are provided.

While in the example from FIG. 1 the ball spindles 6 is circularly cylindrical in the two support sections 8, 10 adjoining the ball body 12 without shoulders. The example in FIG. 3, however, differs in that the ball spindle 6 at the transition between the bearing bushes 34 and 36 is relieved such that an annular shoulder 64 is formed on which the ball spindle 6 undergoes transition into a support section of smaller diameter.

While various embodiments have been chosen to illustrate the invention, it will be understood by those skilled in the art that various changes and modifications can be made therein without departing from the scope of the invention as defined in the appended claims.

What is claimed is:
1. A ball valve, comprising:
a valve housing having first and second pivot supports and having a media passage with an input part and an output part, said first pivot support having a first support cover with axially spaced inner and outer slide bearing bushes detachably mounted in said valve housing, said second pivot support having a second support cover with axially spaced inner and outer slide bearing bushes detachably mounted in said valve housing, each said support cover being an identical bearing sleeve and installable from an exterior of said valve housing in a spindle passage of said valve housing, each of said support covers being arranged between said valve housing and the respective inner and outer slide bearing bushes and having inside bearing seats receiving said slide bearing bushes, said inner slide bushes being identical, said outer slide bearing bushes being identical;
a ball spindle pivoted about an axis in said valve housing and having first and second end sections mounted in said first and second pivot supports, and engaging said slide bearing bushes, respectively;
a ball body connected to said end sections of said ball spindle on opposite sides of said ball body forming a blocking element in said media passage between said input and said output parts at an axial distance from said pivot supports;
a flow opening located in said ball body alignable with said media passage for unblocking said media passage by turning said ball spindle;
wherein each end of said spindle passage in said valve housing is stepped with an inner diameter in a region bordering said ball body being slightly larger than an outside diameter of said ball body and an outer diameter in a region nearer said exterior of said housing being larger than said inner diameter; and
wherein said bearing sleeves have stepped inside surfaces forming said bearing seats for said slide bearing bushes therein, said slide bearing bushes in each said bearing sleeve being axially spaced a distance from one another and receiving an O-ring therebetween.

2. A ball valve according to claim 1 wherein
said bearing sleeves are threadedly engaged with said valve housing.

3. A ball valve according to claim 1 wherein
each of said first and second end sections has an annular shoulder at a transition thereof between radially larger and smaller sections thereof received by the respective inner and outer slide bearing bushes.

4. A ball valve according to claim 1 wherein
first and second sleeve bodies are located in said media passage adjacent said ball body and form a sealing shell interacting with said ball body; and
springs in said valve housing pretension said sleeve bodies against said ball body.

5. A ball valve according to claim 4 wherein
said ball spindle and said sleeve bodies are formed of paired alloys based on at least one of cobalt and an copper-aluminum alloy.

6. A ball valve according to claim 1 wherein
said slide bearing bushes are formed of a copper-aluminum alloy.

7. A ball valve according to claim 4 wherein
flanges are attached to exterior surfaces of said valve housing by screws at opposite ends of said media passage, said flanges having integrated connecting pieces forming connections to a fluid system.

8. A ball valve according to claim 7 wherein
said flanges are identical and comprise pipe sockets projecting into said media passage and having ends supporting said springs.

* * * * *